US012768546B2

(12) United States Patent
Chidiac

(10) Patent No.: US 12,768,546 B2
(45) Date of Patent: Oct. 20, 2026

(54) DEVICE FOR SECURING WINDOW AIR CONDITIONERS

(71) Applicant: James Maguire Chidiac, Newburyport, MA (US)

(72) Inventor: James Maguire Chidiac, Newburyport, MA (US)

(*) Notice: Subject to any disclaimer, the term of this patent is extended or adjusted under 35 U.S.C. 154(b) by 180 days.

(21) Appl. No.: 18/429,232

(22) Filed: Jan. 31, 2024

(65) Prior Publication Data

US 2024/0353117 A1 Oct. 24, 2024

Related U.S. Application Data

(60) Provisional application No. 63/442,445, filed on Jan. 31, 2023.

(51) Int. Cl.

| | |
|---|---|
| ***F24F 1/027*** | (2019.01) |
| ***E05B 65/08*** | (2006.01) |
| ***E05C 19/18*** | (2006.01) |
| ***F16B 39/16*** | (2006.01) |
| ***F24F 1/031*** | (2019.01) |

(52) U.S. Cl.
CPC .......... *F24F 1/027* (2013.01); *E05B 65/0888* (2013.01); *E05C 19/182* (2013.01); *F16B 39/16* (2013.01); *F24F 1/031* (2019.02)

(58) Field of Classification Search
CPC ...... F16B 39/12; F16B 39/16; E05B 65/0888; E05B 65/0894; E05C 19/182; E05C 17/13; A47B 91/026; F24F 1/027; F24F 1/031
See application file for complete search history.

(56) References Cited

U.S. PATENT DOCUMENTS 1,647,992 A * 11/1927 Hartman .............. A47B 91/028 248/188.4
1,891,588 A * 12/1932 Claus ........................ E06B 9/02 410/151
2,069,012 A * 1/1937 Lynes ........................ B60S 9/06 254/102
2,890,545 A * 6/1959 Fiddler ................ A47B 91/024 248/188.4
2,930,639 A * 3/1960 Wood ................... A47B 91/028 403/83

(Continued)

OTHER PUBLICATIONS

History of Welding (Year: 2016).*
Tillman Hex vs Heavy Hex Jam Nut (Year: 2018).*

*Primary Examiner* — Christopher R Zerphey
(74) *Attorney, Agent, or Firm* — Ferguson Braswell Fraser Kubasta PC

(57) ABSTRACT

A device including a beam and a flanged threaded nut fixedly attached to the beam at about the first end of the beam. A flange of the flanged threaded nut is sized and dimensioned to cover the first end of the beam. A bolt is connected to the flanged threaded nut via a threaded shank being disposed within the flanged threaded nut. The bolt is slidable along a longitudinal axis of the beam by turning the bolt. The device also includes a threaded nut connected to the threaded shank and disposed between the bolt head and the flanged threaded nut. The threaded nut is slidable along the longitudinal axis by turning the threaded nut. The device also includes a cover, disposed around an outside surface of the beam, sized and dimensioned to slide along the longitudinal axis and to slide over the diameter of the bolt head.

20 Claims, 4 Drawing Sheets

(56) References Cited

U.S. PATENT DOCUMENTS

| | | | | | |
|---|---|---|---|---|---|
| 3,027,140 | A * | 3/1962 | Holzbach | E04G 25/065 248/354.3 |
| 3,880,394 | A * | 4/1975 | Wisecarver | E04G 25/065 410/151 |
| 4,461,502 | A * | 7/1984 | Burgess | E05B 65/0888 292/262 |
| 4,792,169 | A * | 12/1988 | Petry | E05B 65/0888 292/276 |
| 4,927,198 | A * | 5/1990 | Fennell | E05B 65/0888 292/306 |
| 5,090,837 | A * | 2/1992 | Mower | F16L 37/02 403/361 |
| 5,727,767 | A * | 3/1998 | Jefrey | B60S 9/22 248/354.3 |
| 7,780,128 | B2 * | 8/2010 | Walsberg | A47B 91/024 248/188.4 |
| 9,187,900 | B2 * | 11/2015 | Herion | E04C 5/065 |
| 9,260,895 | B1 * | 2/2016 | Jewett | E05C 17/44 |
| 10,683,686 | B2 * | 6/2020 | Brown | E05C 17/30 |
| 2012/0211978 | A1 * | 8/2012 | Gardiner | F16B 7/105 285/382 |
| 2018/0128020 | A1 * | 5/2018 | Smith | E05C 19/182 |
| 2024/0218707 | A1 * | 7/2024 | Hernandez | E05B 65/0888 |

* cited by examiner

DEVICE FOR SECURING WINDOW AIR CONDITIONERS

BACKGROUND

Window air conditioners may be inserted into and through an opening exposed by an open window of a building. However, the window air conditioner may not be in a stable position within the opening. It would be undesirable for the window air conditioner to tilt, move, or fall out of the opening. Thus, methods and devices are desired for securing a window air conditioner within the opening exposed by an open window.

SUMMARY

One or more embodiments provide for a device including a beam having a first end and a second end opposite the first end. The device also includes a flanged threaded nut fixedly attached to the beam at about the first end. A flange of the flanged threaded nut is sized and dimensioned to cover the first end of the beam. The device also includes a bolt including a bolt head attached to a threaded shank. The bolt is connected to the flanged threaded nut via the threaded shank being disposed within the flanged threaded nut. The bolt is slidable along a longitudinal axis of the beam by turning the bolt with respect to the flanged threaded nut. The bolt head has a diameter. The device also includes a threaded nut connected to the threaded shank and disposed between the bolt head and the flanged threaded nut. The threaded nut is slidable along the longitudinal axis by turning the threaded nut about the threaded shank. The device also includes a cover disposed around an outside surface of the beam. The cover is sized and dimensioned to slide along the longitudinal axis and to slide over the diameter of the bolt head.

One or more embodiments also include a system including a window slidable to expose an opening in a structure. The window is disposed within a frame connected to the structure. The window has a window edge. The system also includes an air conditioning unit disposed within the opening. The system also includes a device disposed between the frame and the window edge. The device includes a beam having a first end and a second end opposite the first end. The second end of the beam is disposed against the frame. The device also includes a flanged threaded nut fixedly attached to the beam at about the first end. A flange of the flanged threaded nut is sized and dimensioned to cover the first end of the beam. The device also includes a bolt having a bolt head attached to a threaded shank. The bolt is connected to the flanged threaded nut via the threaded shank being disposed within the flanged threaded nut. The bolt is slidable along a longitudinal axis of the beam by turning the bolt with respect to the flanged threaded nut. The bolt head has a diameter. The bolt head is disposed against the window edge. The device also includes a threaded nut connected to the threaded shank and disposed between the bolt head and the flanged threaded nut. The threaded nut is slidable along the longitudinal axis by turning the threaded nut about the threaded shank. The device also includes a cover disposed around an outside surface of the beam. The cover is sized and dimensioned to slide along the longitudinal axis and to slide over the diameter of the bolt head.

One or more embodiments also provide for a method including opening a window of a structure by sliding the window upwardly or downwardly to expose an opening in the structure. The method also includes inserting a window air conditioner into the opening. The method also includes placing a window edge against the window air conditioner. The method also includes inserting a device between the window and a frame of the window. The frame is connected to the structure. The device includes a beam having a first end and a second end opposite the first end. The second end is disposed against the frame. The device also includes a flanged threaded nut fixedly attached to the beam at about the first end. A flange of the flanged threaded nut is sized and dimensioned to cover the first end of the beam. The device also includes a bolt having a bolt head attached to a threaded shank. The bolt is connected to the flanged threaded nut via the threaded shank being disposed within the flanged threaded nut. The bolt is slidable along a longitudinal axis of the beam by turning the bolt with respect to the flanged threaded nut. The bolt head has a diameter and is disposed against the window edge. The device also includes a threaded nut connected to the threaded shank and disposed between the bolt head and the flanged threaded nut. The threaded nut is slidable along the longitudinal axis by turning the threaded nut about the threaded shank. The device also includes a cover disposed around an outside surface of the beam. The cover is sized and dimensioned to slide along the longitudinal axis and to slide over the diameter of the bolt head. The method also includes sliding the bolt along the longitudinal axis to tighten the device between the window edge and the frame. The method also includes sliding the threaded nut along the longitudinal axis until the threaded nut is disposed against the flanged threaded nut. The method also includes sliding the cover along the longitudinal axis until the cover covers at least one of the threaded nut, the threaded shank, and the bolt head.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

One or more embodiments are directed to a device for securing a window air conditioner within a opening in a structure created by an open window. The device is securable between a first edge of the window and a first frame edge of the window. The length of the device may be adjusted in order to apply pressure between the first frame edge and the first edge of the window. The pressure is transferred to the window air conditioner, and thence to an second frame edge opposite the first frame edge. As a result, the window air conditioner is secured between the window and the frame. The pressure urges the window air conditioner to remain in a selected position within the opening.

The device may be provided with other features. For example, a threaded nut may be provided on a threaded shank of the device. The threaded nut helps prevent the threaded shank from sliding longitudinally with respect to the device, and thereby helps prevent the device from shortening and reducing the set pressure between the frame and the window.

Another feature may be a cover disposed around a beam of the device. The cover may be sized and dimensioned to be longitudinally slidable to cover the threaded shank and a bolt head that is placed against either the window or the frame. Thus, the cover protects the threaded nut, the threaded shank, and the bolt head. In an embodiment, the cover may serve as an aesthetic cover to hid parts of the device that may be considered less attractive by some.

Another feature may be extending beams. The extending beams may be connected to a main beam that forms the outer housing of the device. The extending beams longitudinally extend the length of the device in order to accommodate windows and frames of different sizes.

Another feature may be a cap connected to an end of the device. The cap may help protect a surface of the window or the frame when an end of the device is placed against the surface and pressure is applied with the device. Similarly, a pad may be connected to the bolt head in order to protect an opposing surface (the other of the window or the frame) when pressure is applied with the device.

Other features may be provided, so the examples above do not necessarily limit the appended claims. Thus, attention is turned to the figures.

Figures 1A, 1B:
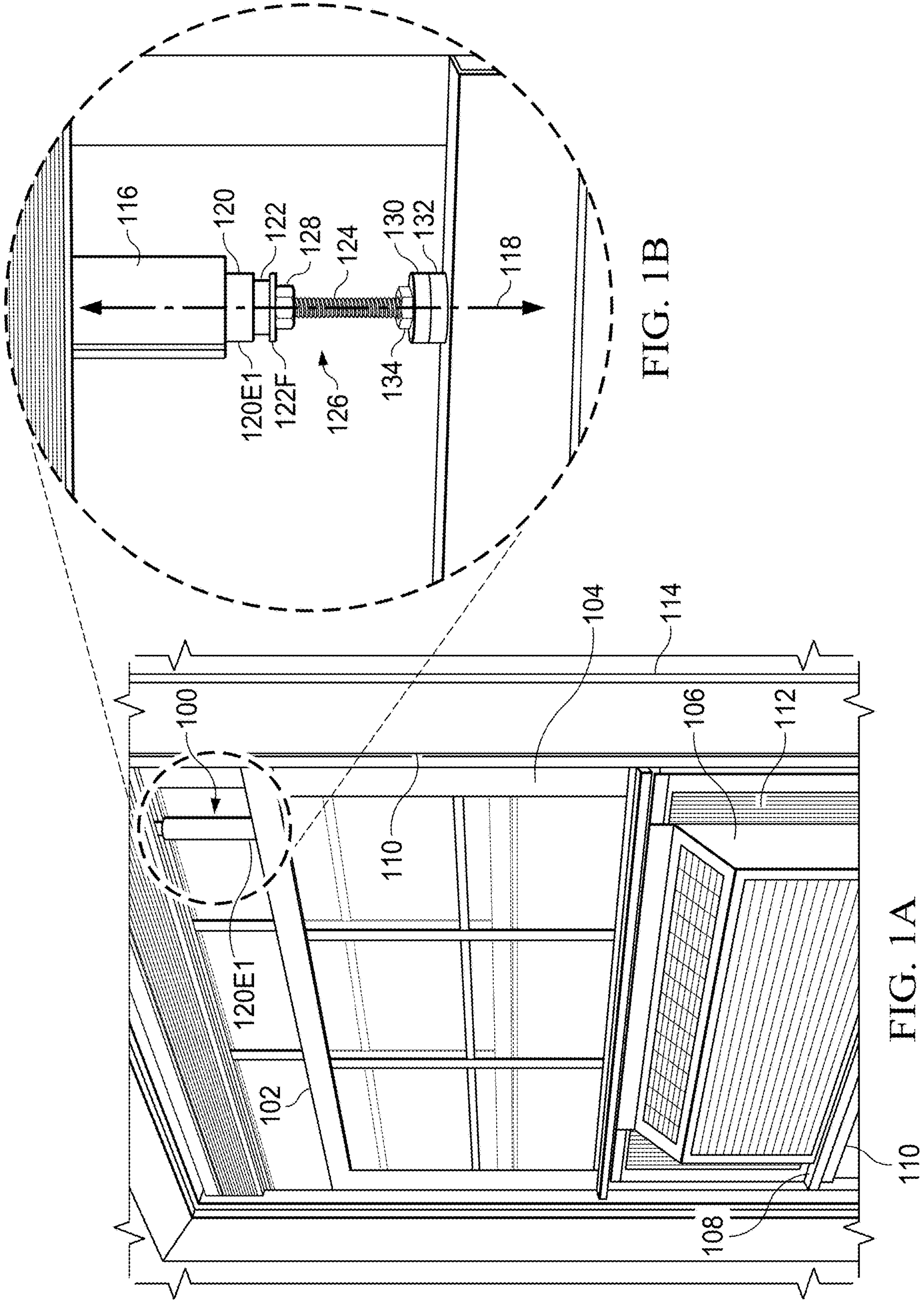
FIG. 1A and FIG. 1B show a window air conditioner stabilized by a device for securing window air conditioners, in accordance with one or more embodiments.

FIG. 1A and FIG. 1B show a window air conditioner stabilized by a device for securing window air conditioners, in accordance with one or more embodiments. FIG. 1A shows a window air conditioner secured, using a device of one or more embodiments, in an opening created by an open window. FIG. 1B shows a blow-up section of FIG. 1A and shows additional details of the device.

Figure 2:
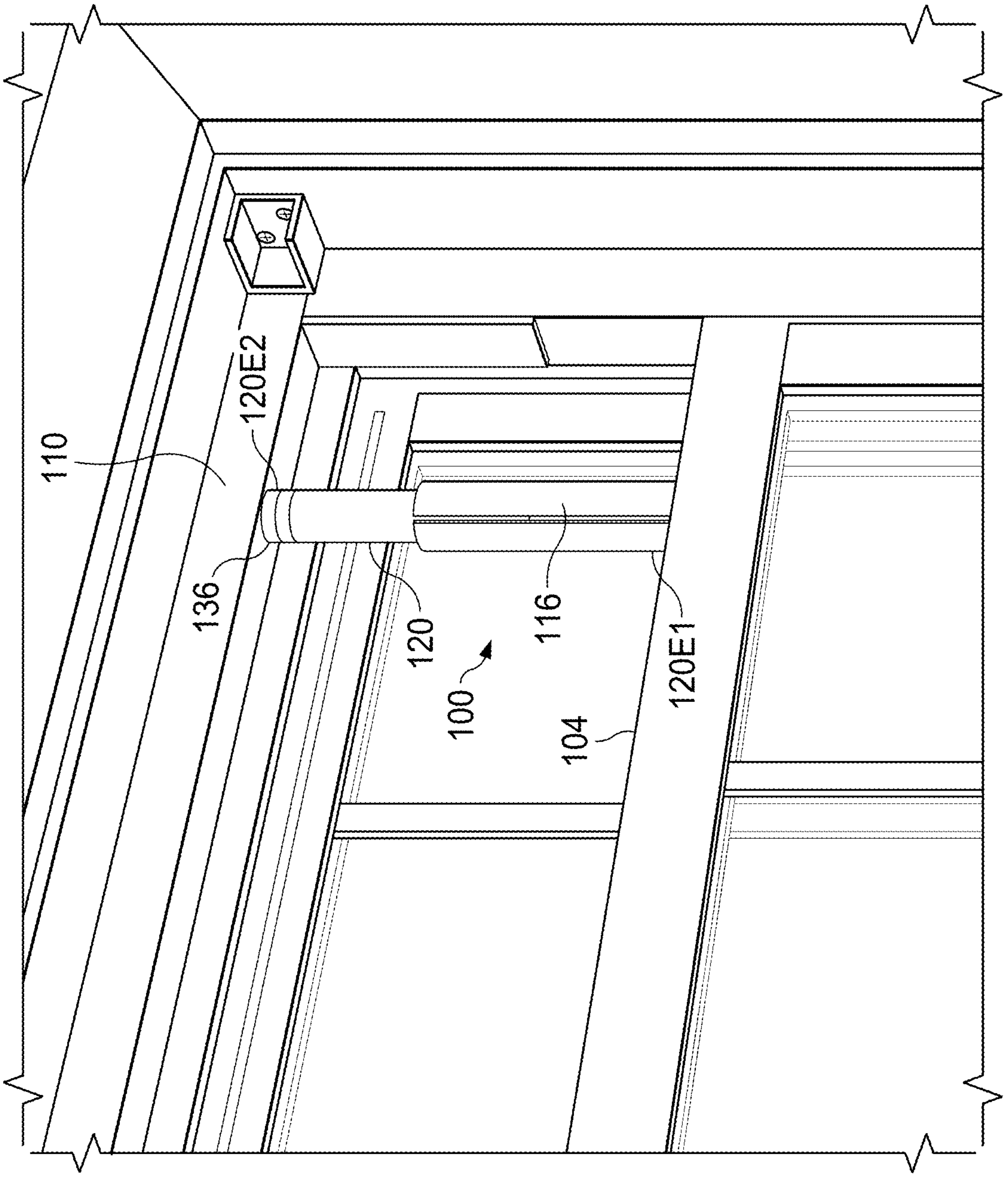
FIG. 2 shows another view of a device for securing window air conditioners, in accordance with one or more embodiments.
Figure 3:
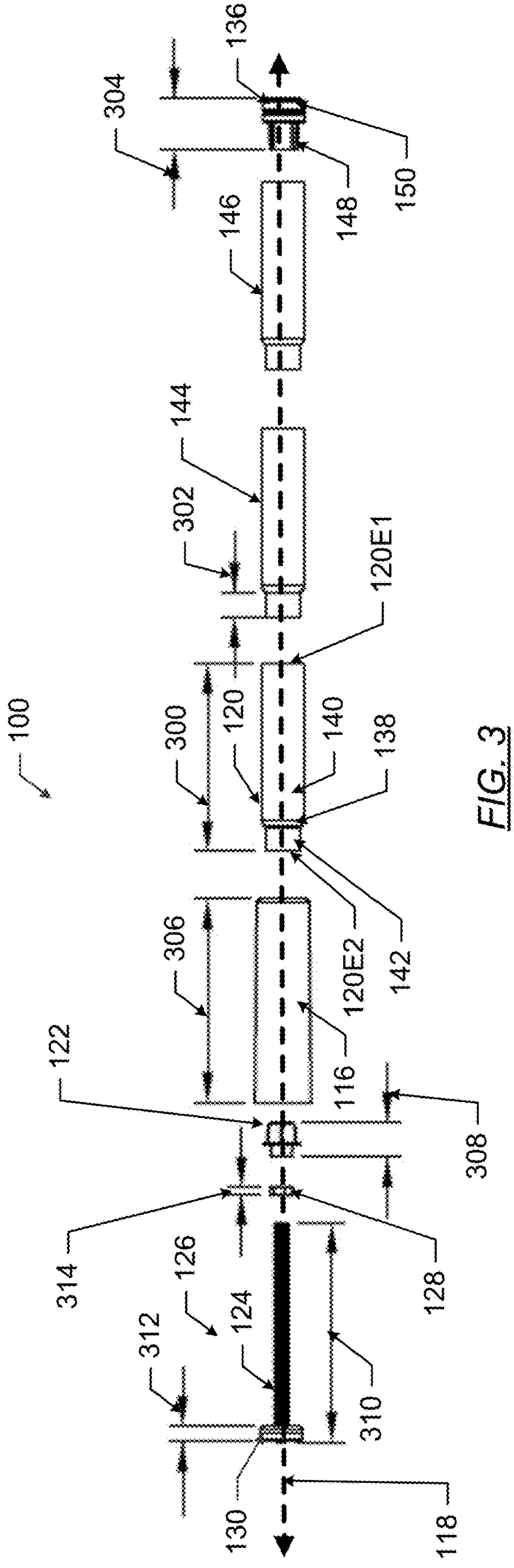
FIG. 3 shows an exploded schematic of a device for securing window air conditioners, in accordance with one or more embodiments.
Figure 4:
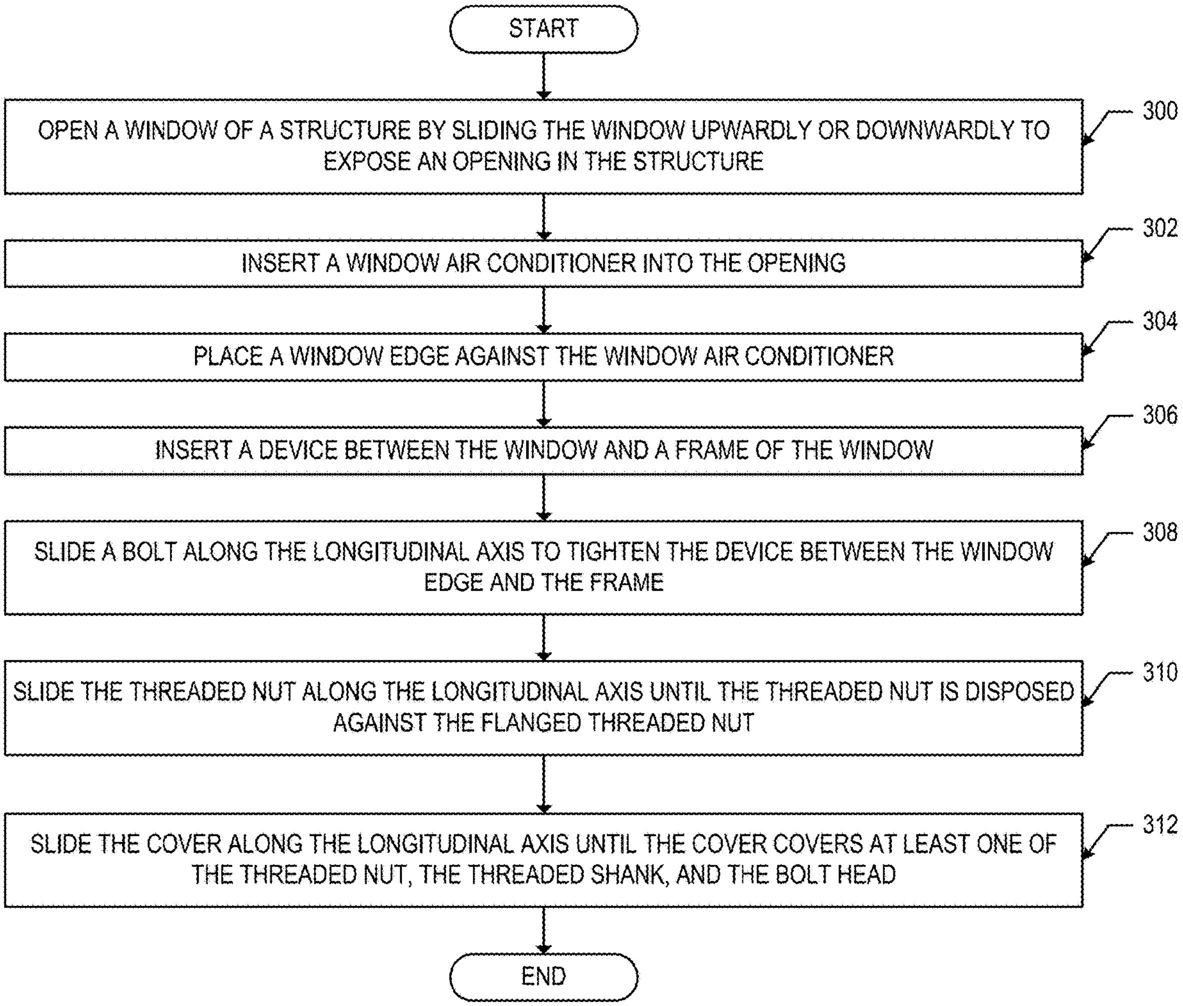
FIG. 4 shows a method for securing a window air conditioner using a device for securing window air conditioners, in accordance with one or more embodiments.

FIG. 1A shows a device (100). The device (100) may be referred to as an "AC QuikStik" in one or more embodiments, but the device (100) may be referred to by many different names. While various components of the device (100) are shown in FIG. 2, FIG. 3, and FIG. 4, the device (100) may be characterized as a longitudinal beam, rod, bar, etc. with adjustable components. The device (100) may be designed to fit between a frame (see FIG. 2) and an edge (102) of a window (104).

The device (100) is configured, as shown in FIG. 1B through FIG. 4, to apply a pressure between the frame and the edge (102) of the window (104). The pressure transfers through the window, onto a window air conditioner (106), and then through the window air conditioner (106) to an opposite edge (108) of the frame (110). The frame (110) is shown at two reference numeral locations to indicate horizontal and vertical portions of the frame (110).

Note that in the example of FIG. 1A, the window (104) slides upwardly, relative to the direction of gravity, in order to expose an opening (112) in a structure (114) to which the frame (110) is attached. The window air conditioner (106) is disposed in the opening (112). The device (100) is configurable, as described below, to apply pressure between the upper portion of the frame (110) (see FIG. 2) and the edge (102) of the window (104). The pressure is applied downwardly, relative to gravity, against the window (104), thereby urging the window air conditioner (106) to remain in place between the opposite edge of the window (104) and the lower edge of the frame (110).

However, one or more embodiments contemplate that the window (104) may open upwardly, relative to gravity, rather than downwardly. In this case, the device (100) may be arranged on the opposite side (i.e. disposed between the lower edge of the frame (110) and the lower edge of the window (104)).

Similarly, in one or more embodiments, the window (104) may slide horizontally with respect to the direction of gravity. In this case, the device (100) may be arranged horizontally between one or both sides of the frame (110) and the corresponding edge or edges of the window (104).

In view of the various orientations possible for the device (100), the following nomenclature is used for clarity. The edge of the window (104) that is disposed against the window air conditioner (106) may be referred to as a "first edge." The edge of the window (104) that is disposed against the device (100) may be referred to as a "second edge." In the example of FIG. 1A, the second edge is the edge (102). Similarly, the edge of the frame against which the window air conditioner (106) is disposed may be referred to as a "first frame edge." Correspondingly, the edge of the frame against which the device (100) is disposed may be referred to as a "second frame edge." Note that the terms "first," "second," etc. may be reversed or interchanged, and thus serve only to help identify clearly arrangements of components, as described with respect to one or more embodiments.

Attention is now turned to FIG. 1B, which shows a blown-up portion of FIG. 1A. In addition, a cover (116) of the device (100) has been slid along a longitudinal axis (118) of the device (100) in order to expose some of the features of the device (100). Note that while the longitudinal axis (118) is disposed parallel to a direction of gravity in FIG. 1B, the device (100) may be placed in various orientations relative to gravity (e.g., horizontally with respect to the direction of gravity in the case of a window that slides horizontally with respect to the direction of gravity). Thus, the longitudinal axis (118) is defined along a length of the device (100), and not necessarily with respect to any reference direction (e.g., the direction of gravity).

As shown in FIG. 1B, the device includes a beam (120). While the beam (120) is shown as a cylinder in FIG. 1B, the beam (120) may be of various cross-sectional shapes (e.g., square, hexagonal, oval, or some other polygon or of a complex shape). The beam is sturdy, relative ordinary operating conditions. Ordinary operating conditions refers to the pressures and forces expected to be applied by the device (100) when securing the window air conditioner (106) within the opening (112) via applying pressure between the edge (102) of the window (104) and the frame (110) secured to the structure (114). The beam (120) material may be metal, plastic, etc.

The beam (120) may be characterized as having a first end (120E1) (see also FIG. 1A and FIG. 2) and a second end (see 120E2 shown in FIG. 2). The terms "first" and "second" are used only to distinguish ends of the device, and thus the terms may be interchanged in different embodiments.

A flanged threaded nut (122) is fixedly attached to the beam (120) at the first end (120E1). The term "fixedly attached" means that the flanged threaded nut (122) is not removable from the beam (120) under expected operating conditions. For example, the flanged threaded nut (122) may be welded to the beam (120), glued to the beam (120), bolted to the beam (120), made as an integral part of the beam (120), or otherwise fixedly attached to the beam (120).

A flange (122F) of the flanged threaded nut (122) is sized and dimensioned to cover the first end (120E1) of the beam (120). "Sized and dimensioned" means that physical, three-dimensional dimensions of the object (in this case, the flanged threaded nut (122)) are set and proportioned to accommodate the described relationships among components. Thus, as described, the flange (122F) covers any opening that may have existed at the first end (120E1) of the beam (120). The 120F of the flanged threaded nut (122) may be about the radius or width of the beam (120) of the beam (120) in some embodiments. "About" means equal to, or within a specified engineering design tolerance in this example.

The flanged threaded nut (122) may have a female threaded opening (see FIG. 3) into which a threaded shank (124) of a bolt (126) may be inserted. Turning the threaded shank (124) within the opening of the flanged threaded nut (122) may cause the bolt (126) to move along the longitudinal axis (118), either into or out of the beam (120) as desired. For example, turning the bolt (126) clockwise may slide the bolt (126) longitudinally outwardly from the beam (120) and turning the bolt (126) counter-clockwise may slide the bolt (126) longitudinally inwardly into the beam (120) (or vice versa in some embodiments). Thus, turning the bolt (126) moves the threaded shank (124) inwardly or outwardly with respect to the flanged threaded nut (122), thereby lengthening or shortening an overall length of the device (100). Note that it also may be possible to turn the beam (120), the flanged threaded nut (122), or some other part of the device (100) in order to effectively turn the bolt (126) with respect to the threaded shank (124).

In an embodiment, a threaded nut (128) may be connected to the threaded shank (124) and disposed between the flanged threaded nut (122) and a bolt head (130) of the bolt (126). The threaded nut (128) is slidable along the longitudinal axis (118) by turning the threaded nut (128) about the threaded shank (124) of the bolt (126). Turning may be accomplished by turning the threaded nut (128), though it may also be possible to turn the threaded shank (124) or both the threaded nut (128) and the threaded shank (124) to longitudinally advance or retract the threaded nut (128).

In use, the threaded nut (128) may be advanced until the threaded nut (128) is disposed against the flanged threaded nut (122). In this manner, the threaded nut (128) restrains the threaded shank (124) from unexpectedly advancing or retracting from the flanged threaded nut (122).

As indicated above, the cover (116) may be disposed around an outside surface of the beam (120). The cover (116) is sized and dimensioned to slide along the longitudinal axis (118) and to slide over the diameter of the bolt head (130). Thus, as shown in FIG. 1B, the cover (116) may cover the flanged threaded nut (122), the threaded nut (128), the threaded shank (124), and the bolt head (130). The cover (116) may be slid along the longitudinal axis (118) so that an end of the cover (116) is flush with (disposed against) either end of the device (100). The cover (116) may be formed from plastic (hard or soft, relative to the grip strength of an average human hand). The cover (116) also may be formed from other materials, such as silicone, metal, etc.

In an embodiment, a pad (132) may be connected to the bolt head (130). The pad (132) may serve to protect the window (104) (or protect the frame (110), if disposed against the frame (110)). In the example of FIG. 1B, the bolt head (130) is metal and the pad (132) is rubber. However, the pad (132) may be formed from other substances that may be softer than the metal of the bolt head (130). For example, the pad (132) may be plastic, wood, cloth, etc. Similarly, the bolt head (130) may be formed from other substances, such as plastics, wood, or other materials sturdy enough to accommodate forces expected to be placed upon the bolt head (130) when the device (100) is used to secure a window air conditioner within an opening in a structure.

The pad (132) may be about flat, with respect to the surface of the pad (132) that faces the window (104) (or the frame (110)). However, the pad may have other shapes, such as an oblong shape, a toroidal shape, etc.

The pad (132) may be fixedly connected to the bolt head (130), or may be removably connected to the bolt head (130). Removably connected means that the pad (132) may be removed or connected to the bolt head (130) under ordinary operating conditions, as intended by a user.

As shown in FIG. 2 and FIG. 3, a cap (136) may be connected to the second end of the beam (120). The cap (136) may serve a similar function as the pad (132) of FIG. 1B by protecting the frame (110) (or the window (104)) as pressure is applied by the device (100). The cap (136) may be removably attached to the second end of the beam (120). Like the pad (132), the cap (136) may be about flat, with respect to the surface of the cap (136) that faces the frame (110) (or the window (104)).

While FIG. 1A shows the device (100) in use, in other embodiments, multiple devices may be disposed between the window (104) and the frame (110). For example, a second beam (not shown) may be disposed on the opposite side of the window (104), relative to the device (100).

In addition, the device (100) may be extendable. For example, the cap (136) may be removed from the second end of the beam (120), and a second beam (see FIG. 3) inserted into the beam (120). Still further beams may be added in order to increase a total length of the device (100). Thus, for example, while FIG. 3 shows three beams (total), the device may include four or more beams or only two beams. Similarly, the device (100) may include as few as one beam, i.e., the beam (120).

Other features may be provided with the device (100). For example, a second threaded nut (134) may be connected to the threaded shank (124). In an embodiment, the second threaded nut (134) may be fixedly attached to the bolt head (130) in order to provide enhanced stability for the device (100).

While FIG. 1A and FIG. 1B show a configuration of components, other configurations may be used without departing from the scope of one or more embodiments. For example, various components may be combined to create a single component. As another example, the functionality performed by a single component may be performed by two or more components.

FIG. 2 shows another view of a device for securing window air conditioners, in accordance with one or more embodiments. The device (100) is shown with the cover (116) covering the threaded shank (see FIG. 1) and the bolt head (see FIG. 1). However, FIG. 2 also shows the second end (120E2) of the beam (120).

Also shown is the cap (136) inserted into the second end (120E2) of the beam (120). The cap (136) is disposed against the frame (110), thereby also disposing the second end (120E2) of the beam (120) against the frame.

The cap (136) may include a top (see FIG. 3) rotatably connected to a fitting (see FIG. 3). The fitting fits into the second end (120E2) of the beam (120), and may be secured by way of a pressure fitting within the beam (120). The top of the cap may rotate around the longitudinal axis, relative to the fitting. In this manner, the fitting will remain tightly in place within the beam (120) while the user tightens the device (100) (e.g., by sliding the bolt (126) longitudinally outwardly relative to the beam (120) by rotating the shank (124) within the flanged nut (128)). During such tightening, the top of the cap (136) may rotate if the device (100) as a whole rotates, while preventing the fitting of the cap (136) from rotating along within the beam (120).

The first end (120E1) of the beam (120) is shown disposed against an edge of the window (104). Thus, in use, the device (100) forms a tension fit between the frame (110) and the window (104), thereby applying pressure through the window (104), through the window air conditioner (106) (see FIG. 1A), and to the opposite side of the frame (110) (see FIG. 1A).

FIG. 3 shows an exploded schematic of a device for securing window air conditioners, in accordance with one or more embodiments. The device (100) shown in FIG. 3 may be the device (100) shown in FIG. 1A, FIG. 1B, or FIG. 2. However, in FIG. 3, the various components of the device (100) are shown exploded along the longitudinal axis (118) of the device (100).

The beam (120) is shown, having the first end (120E1) and the second end (120E2). The beam (120) has an overall length (along the longitudinal axis (118)), as shown by arrows (300). Proximate the first end (120E1), a beam bevel (138) is defined around a circumference (or perimeter) of the beam (120). The beam bevel (138) is disposed between a main beam portion (140) and an end beam portion (142). The end beam portion (142) has a smaller radial cross section than the main beam portion (140) such that the end beam portion (142) may fit within the main beam portion (140). Additionally, the end beam portion (142) may be shorter, along the longitudinal axis (118), than the main beam portion (140), as shown by the arrows (302) which indicate a length of the end beam portion (142). In an embodiment, the length of the end beam portion (142) may be similar for each of the beam (120), the secondary beam (144), and the tertiary beam (146), but may be of different lengths in different embodiments.

For example, additional beams may be provided, such as secondary beam (144) and tertiary beam (146). The secondary beam (144) and the tertiary beam (146) may be about identical in dimensions, compared to the beam (120). However, the secondary beam (144) or the tertiary beam (146) may have different lengths or different features, relative to the beam (120). However, both the secondary beam (144) and the tertiary beam (146) have corresponding main beam portions and end beam portions, as described with respect to the beam (120). In this manner, the end beam portion of one beam may fit into the main beam portion of another beam. Accordingly, the overall length of the device (100) may be extended by inserting the secondary beam (144) into the beam (120), and optionally by inserting the tertiary beam (146) into the secondary beam (144). Additional beams also may be provided.

The cap (136) is shown at a far end of the device (100). An overall length of the cap (136) is shown at arrows (304). While the cap (136) is shown as being cylindrical in FIG. 3, the cap (136) may have a variety of different shapes.

The cap (136) may have a fitting (148) that is sized and dimensioned to fit into a main beam portion of any of the beam (120), the secondary beam (144), or the tertiary beam (146) (or any other beam that forms the last beam in the sequence of beams for any given arrangement of the device (100)). The fitting (148) may form a tension fit within the main beam portion of the corresponding beam. The fitting (148) may have a variety of different shapes, and need not be a cylinder as shown in FIG. 3.

The cap (136) may have a top (150) disposed opposite the fitting (148) along the longitudinal axis (118). As described above with respect to FIG. 2, the top (150) may be rotatably connected to the fitting (148), via a connector such as a bolt, screw, rod, bearing, etc. Thus, in an embodiment, the top (150) may be freely rotatable around the longitudinal axis (114) relative to the fitting (148), as described with respect to FIG. 2.

The top (150) may have a substantially flat end in order to facilitate placing the top (150) of the cap (136) against a frame or a window. The shape of top (150) is cylindrical, as shown in FIG. 3. However, the top (150) may have a variety of different shapes. Further, the shape of the top (150) may have the same shape as the fitting (148) or may have a different shape than the fitting (148). As shown in FIG. 3, the top (150) has a greater diameter than the fitting (148) such that the fitting (148) may fit within the beam (120) and such that the top (150) covers the beam. The top (150) may have a diameter that is about equivalent to the diameter of the beam (120). However, the diameter of the top (150) may be larger than the diameter of the beam (120), or the diameter of the top (150) may be smaller than the diameter of the fitting (148), or the top (150) may have some other desired dimensions.

The flanged threaded nut (122) is shown in FIG. 3 as being between the cover (116) and the beam (120). However, as shown in FIG. 1B, the flanged threaded nut (122) may be fixedly attached to the beam (120), and specifically to the second end (120E2) of the end beam portion (142). The overall length of the flanged threaded nut (122) is indicated by arrows (308).

As shown in FIG. 1A, FIG. 1B, and FIG. 2, the cover (116) may be disposed over the external surface of the beam (120) and other components of the device (100). An overall length of the cover (116) is shown by arrows (306). The overall length of the cover (116) may be of various lengths, though in an embodiment, the overall length of the cover (116) may be at least equal to the overall length of any one or more of the beam (120), the secondary beam (144), and the tertiary beam (146), plus the overall length of the bolt (126).

The bolt (126) has an overall length as indicated by arrows (310). The threaded shank (124) may be disposed through a threaded hole in the flanged threaded nut (122), and may further extend into one or more of the beam (120), the secondary beam (144), and the tertiary beam (146). The bolt (126) includes the bolt head (130), which as an overall length indicated by arrows (312).

Additionally, the threaded nut (128) may be disposed on the threaded shank (124) of the bolt (126), between the bolt head (130) and the flanged threaded nut (122). In use, the threaded nut (128) may be turned and thereby slid longitudinally towards the flanged threaded nut (122) until the threaded nut (128) is disposed against the flanged threaded nut (122). In this manner, the threaded nut (128) may further reinforce a selected position of the bolt head (130) within the flanged threaded nut (122) and the beam (120). An overall length of the threaded nut (128) is indicated by arrows (314).

As shown in FIG. 3, various lengths of components are shown by the corresponding arrows. The values of the lengths may vary, both in numerical value and in proportion to other lengths indicated. Thus, the proportions shown in FIG. 3 do not necessarily limit the appended claims. However, the proportional sizes of components shown in the example shown in FIG. 3 may apply to an example embodiment. Thus, for example, it may be said in such an example embodiment that the threaded shank (124) is longer than the bolt head (130), that the bolt (126) is about equal to or longer than the beam (120), and that the cover (116) is at least as long as the arrows (300) plus possibly at least some portion of the bolt (126). However, other examples are also possible.

FIG. 4 shows a method for securing a window air conditioner using a device for securing window air conditioners, in accordance with one or more embodiments. The method of FIG. 4 may be implemented using the device as shown and described in FIG. 1A, FIG. 1, FIG. 2, and FIG. 3.

Step 300 includes opening a window of a structure by sliding the window upwardly or downwardly to expose an opening in the structure. The window also may be slid in either direction horizontally, with respect to a direction of gravity, depending on the functionality of the window. Thus, the term "upwardly or downwardly" also includes horizontal sliding, and should be read as such.

Step 302 includes inserting a window air conditioner into the opening. The window air conditioner is at least partially disposed into or through the opening.

Step 304 includes placing a window edge against the window air conditioner. For example, the window may be moved downwardly or upwardly (a direction of movement opposite to opening the window) until the window edge is disposed against the window air conditioner. The term "disposed against the window air conditioner" also includes the possibility of intervening structures being placed between the window air conditioner and the window edge.

Step 306 includes inserting a device between the window and a frame of the window. "Inserting the device between the window and the frame of the window" also includes the possibility of intervening structures being placed between the device and the window, or between the device and the frame, or both.

The frame is connected to the structure. For example, the frame may be connected to or be part of the structure. In other words, the term "connected to the structure" includes the possibility that the frame is an integral part of the structure.

The device may be the device as shown and described in any of FIG. 1A, FIG. 1B, FIG. 2, or FIG. 3. Thus, the device may be described as being a beam having a first end and a second end opposite the first end, with the second end disposed against the frame. The device also may be described as a flanged threaded nut fixedly attached to the beam at about the first end. A flange of the flanged threaded nut is sized and dimensioned to cover the first end of the beam. The device also may be described as a bolt has a bolt head attached to a threaded shank. The bolt is connected to the flanged threaded nut via the threaded shank being disposed within the flanged threaded nut. The bolt is slidable along a longitudinal axis of the beam by turning the bolt with respect to the flanged threaded nut. The bolt head includes a diameter and is disposed against the window edge. The device also may be described as a threaded nut connected to the threaded shank and disposed between the bolt head and the flanged threaded nut. The threaded nut is slidable along the longitudinal axis by turning the threaded nut about the threaded shank. The device also may be described as a cover disposed around an outside surface of the beam. The cover is sized and dimensioned to slide along the longitudinal axis and to slide over the diameter of the bolt head.

Step 308 includes sliding the bolt along the longitudinal axis to tighten the device between the window edge and the frame. Sliding the bolt may take place either before or after inserting the device between the window and the frame. In an embodiment, sliding the bolt may be performed to cause the overall length of the device to at least equal a distance between the window and the frame.

Step 310 includes sliding the threaded nut along the longitudinal axis until the threaded nut is disposed against the flanged threaded nut. Placing the threaded nut against the flanged threaded nut may help secure a position of the shank of the bolt relative to the flanged threaded nut. Step 310 may be optional, as the threaded nut may not be part of the device in some embodiments.

Step 312 includes sliding the cover along the longitudinal axis until the cover covers at least one of the threaded nut, the threaded shank, and the bolt head. The cover may help protect various components of the device, such as protecting the bolt from exposure to moisture or other environmental effects. In an embodiment, the cover may also serve an aesthetic function by covering up parts of the device. Step 312 may be optional, as the cover may not be part of the device in some embodiments.

The method of FIG. 4 may be further varied. For example, the method also may include inserting a second device, identical to the device, between the frame and the window edge. In other words, multiple devices may help further secure the window air conditioner within the opening by applying pressure to the window and the frame.

In another example, the method of FIG. 4 also may includes inserting a cap into the second end of the beam such that the cap is disposed between the beam and the frame. Similarly, either together with the cap or independently of the cap, the method also may include inserting a pad between the bolt head and the window edge. The cap, the pad, or both may serve to protect the window, the frame, or both. The cap or pad also may provide additional friction between the window, the frame (or both) and the device, thereby further stabilizing the device between the window and the frame.

Other variations are also possible. For example, the method of FIG. 4 may be performed with respect to structures, other than windows, that are disposed in openings in which an air conditioner unit may be placed and secured. Thus, one or more embodiments may also include methods, other than sliding windows, that use the device (100) of FIG. 1A, FIG. 1B, FIG. 2, and FIG. 3 to secure a window air conditioner. Additionally, other objects may be secured within an opening of a structure. Accordingly, the one or more embodiments are not necessarily limited to securing window air conditioners within an opening of a structure. Yet further, the device (100) of FIG. 1A, FIG. 1B, FIG. 2, and FIG. 3 may have other uses, such as generally to brace or apply pressure between two or more objects.

While the various steps in the flowchart of FIG. 4 are presented and described sequentially, at least some of the steps may be executed in different orders, may be combined or omitted, and at least some of the steps may be executed in parallel. Furthermore, the steps may be performed actively or passively.

The various descriptions of the figures may be combined and may include or be included within the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For example, two angles may be "about congruent" if the values of the two angles are within a first predetermined range of angles for one embodiment, but also may be "about congruent" if the values of the two angles are within a second predetermined range of angles for another embodiment. The ordinary artisan is capable of assessing what is an acceptable engineering tolerance for a particular product, and thus is capable of assessing how to determine the variance of measurement contemplated by the term "about."

As used herein, the term "connected to" contemplates at least two meanings, unless stated otherwise. In a first meaning, "connected to" means that component A was, at least at some point, separate from component B, but then was later joined to component B in either a fixed or a removably attached arrangement. In a second meaning, "connected to" means that component A could have been integrally formed with component B. Thus, for example, a bottom of a pan is "connected to" a wall of the pan. The term "connected to" may be interpreted as the bottom and the wall being separate components that are snapped together, welded, or are otherwise fixedly or removably attached to each other. However, the bottom and the wall may be deemed "connected" when formed contiguously together as a monocoque body.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A device comprising:

a beam having a first end and a second end opposite the first end;

a flanged threaded nut fixedly attached to the beam at about the first end, wherein a flange of the flanged threaded nut is sized and dimensioned to cover the first end of the beam;

a bolt comprising a bolt head attached to a threaded shank, wherein:

the bolt is connected to the flanged threaded nut via the threaded shank being disposed within the flanged threaded nut, the bolt is slidable along a longitudinal axis of the beam by turning the bolt with respect to the flanged threaded nut, and the bolt head comprises a diameter;

a threaded nut connected to the threaded shank and disposed between the bolt head and the flanged threaded nut, wherein the threaded nut is slidable along the longitudinal axis by turning the threaded nut about the threaded shank; and a cover disposed around an outside surface of the beam, wherein the cover is sized and dimensioned to slide along the longitudinal axis independently from sliding of the bolt along the longitudinal axis and to slide past the diameter of the bolt head and past the diameter of the flanged threaded nut.

2. The device of claim 1, further comprising:

a pad connected to the bolt head, opposite the threaded shank.

3. The device of claim 2, wherein the pad is fixedly attached to the bolt head.

4. The device of claim 2, wherein the pad is about flat.

5. The device of claim 1, further comprising:

a cap connected to the second end of the beam.

6. The device of claim 5, wherein the cap is removably attached to the second end of the beam.

7. The device of claim 5, wherein a facing end of the cap is about flat.

8. The device of claim 1, wherein the flange of the flanged threaded nut is welded to the first end of the beam.

9. The device of claim 1, further comprising:

a second beam comprising a first longitudinal section having a first inner diameter and a first outer diameter, and a second longitudinal section having a second inner diameter and a second outer diameter, wherein:

the first outer diameter of the second beam is less than an inner diameter of the beam, the second outer diameter of the second beam is about equal to an outer diameter of the beam, and the second beam is connected to the beam by the first longitudinal section being disposed inside the second end of the beam.

10. The device of claim 1, further comprising:

a second threaded nut connected to the threaded shank, wherein the second threaded nut is fixedly attached to the bolt head.

11. A system comprising:

a window slidable to expose an opening in a structure, wherein:

the window is disposed within a frame connected to the structure, and the window comprises a window edge;

an air conditioning unit disposed within the opening; and a device disposed between the frame and the window edge, the device comprising:

a beam having a first end and a second end opposite the first end, wherein the second end of the beam is disposed against the frame;

a flanged threaded nut fixedly attached to the beam at about the first end, wherein a flange of the flanged threaded nut is sized and dimensioned to cover the first end of the beam;

a bolt comprising a bolt head attached to a threaded shank, wherein:

the bolt is connected to the flanged threaded nut via the threaded shank being disposed within the flanged threaded nut, the bolt is slidable along a longitudinal axis of the beam by turning the bolt with respect to the flanged threaded nut, the bolt head comprises a diameter, and the bolt head is disposed against the window edge;

a threaded nut connected to the threaded shank and disposed between the bolt head and the flanged threaded nut, wherein the threaded nut is slidable along the longitudinal axis by turning the threaded nut about the threaded shank; and a cover disposed around an outside surface of the beam, wherein the cover is sized and dimensioned to slide along the longitudinal axis independently from sliding of the bolt along the longitudinal axis and to slide past the diameter of the bolt head and past the diameter of the flanged threaded nut.

12. The system of claim 11, further comprising:

a pad connected to the bolt head, opposite the threaded shank.

13. The system of claim 11, further comprising:

a cap connected to the second end of the beam.

14. The system of claim 11, wherein the flange of the flanged threaded nut is welded to the first end of the beam.

15. The system of claim 11, further comprising:

a second beam comprising a first longitudinal section having a first inner diameter and a first outer diameter, and a second longitudinal section having a second inner diameter and a second outer diameter, wherein:

the first outer diameter of the second beam is less than an inner diameter of the beam, the second outer diameter of the second beam is about equal to an outer diameter of the beam, the second beam is connected to the beam by the first longitudinal section being disposed inside the second end of the beam, wherein the beam is disposed against the frame via the second beam being disposed directly against the frame.

16. The system of claim 15, further comprising:

a cap connected to the second beam, the cap disposed between the second beam and the frame.

17. The system of claim 11, further comprising:

a second threaded nut connected to the flanged threaded nut via the threaded shank being disposed within the flanged threaded nut, wherein the second threaded nut is fixedly attached to the bolt head.

18. A method comprising:

opening a window of a structure by sliding the window upwardly or downwardly to expose an opening in the structure;

inserting a window air conditioner into the opening;

placing a window edge against the window air conditioner;

inserting a device between the window and a frame of the window, wherein the frame is connected to the structure and wherein the device comprises:

a beam having a first end and a second end opposite the first end, wherein the second end is disposed against the frame;

a flanged threaded nut fixedly attached to the beam at about the first end, wherein a flange of the flanged threaded nut is sized and dimensioned to cover the first end of the beam;

a bolt comprising a bolt head attached to a threaded shank, wherein:

the bolt is connected to the flanged threaded nut via the threaded shank being disposed within the flanged threaded nut, the bolt is slidable along a longitudinal axis of the beam by turning the bolt with respect to the flanged threaded nut, and the bolt head comprises a diameter and is disposed against the window edge;

a threaded nut connected to the threaded shank and disposed between the bolt head and the flanged threaded nut, wherein the threaded nut is slidable along the longitudinal axis by turning the threaded nut about the threaded shank;

a cover disposed around an outside surface of the beam, wherein the cover is sized and dimensioned to slide along the longitudinal axis independently from sliding of the bolt along the longitudinal axis and to slide past the diameter of the bolt head and past the diameter of the flanged threaded nut;

sliding the bolt along the longitudinal axis to tighten the device between the window edge and the frame;

sliding the threaded nut along the longitudinal axis until the threaded nut is disposed against the flanged threaded nut; and sliding the cover along the longitudinal axis until the cover covers at least one of the threaded nut, the threaded shank, and the bolt head.

19. The method of claim 18, further comprising:

inserting a second device, identical to the device, between the frame and the window edge.

20. The method of claim 18, further comprising:

inserting a cap into the second end of the beam such that the cap is disposed between the beam and the frame; and inserting a pad between the bolt head and the window edge.

* * * * *